United States Patent [19]

Long et al.

[11] Patent Number: 4,598,824
[45] Date of Patent: Jul. 8, 1986

[54] STORAGE CONTAINER FOR FLOPPY DISKS AND THE LIKE

[75] Inventors: Jerry M. Long, Pleasanton; James A. Womack, Los Gatos, both of Calif.

[73] Assignee: Innovative Concepts, Inc., San Jose, Calif.

[21] Appl. No.: 646,636

[22] Filed: Aug. 31, 1984

[51] Int. Cl.$^4$ ............................................. B65D 85/57
[52] U.S. Cl. ................................... 206/444; 16/381; 206/45.18; 206/425; 220/335; 220/338
[58] Field of Search .................... 16/263, 380, 381; 206/45.18, 45.2, 309, 311, 425, 444, 472, 509; 220/335, 338, 324, 94 A

[56] References Cited

U.S. PATENT DOCUMENTS

| | | | |
|---|---|---|---|
| 737,360 | 8/1903 | Daly | 16/381 |
| 2,671,617 | 3/1954 | Talge | 220/324 |
| 2,807,355 | 9/1957 | Shiffman | 220/335 |
| 3,347,394 | 10/1967 | Gould | 206/509 |
| 3,468,570 | 9/1969 | Mielke | 16/381 |
| 3,938,691 | 2/1976 | Dumas | 220/94 A |
| 3,979,016 | 9/1976 | Frater | 220/324 |
| 4,062,340 | 12/1977 | Huff | 220/335 |
| 4,164,309 | 8/1979 | Staats | 206/425 |
| 4,364,475 | 12/1982 | D'Elia | 206/425 |
| 4,428,482 | 1/1984 | Ogawa | 220/335 |

FOREIGN PATENT DOCUMENTS

WO82/01810  6/1982  PCT Int'l Appl. ................ 206/311

*Primary Examiner*—George E. Lowrance
*Assistant Examiner*—Jimmy G. Foster
*Attorney, Agent, or Firm*—Claude A. S. Hamrick

[57] ABSTRACT

A storage container for floppy disks and the like includes a cover member pivotally attached to a base member. The base member includes a floor that has a plurality of guide slots which accept dividers so as to permit organizational classification and to facilitate identification and recovery. The base member includes upwardly extending front, rear and side walls. A finger grip is formed in both the front and rear walls. Along the outboard edge of each side wall is a downwardly extending skirt that runs from the front wall to a point near the rear wall. The cover member may be pivoted through an arc of about 90 degrees which provides easy access to the disk stored inside. The rear edge of each skirt provides a cover stop against which the bottom edge of the rear wall of said cover member rests when the cover is in the fully opened condition. This prevents the cover member from opening further. The stops are located so that the cover will remain open but will not provide a significant unbalanced force which would cause an undue backward tilt to said base member when the cover is in the open condition. The storage container may also be moved in the open condition without the cover member rotating backward which would tend to flip the container out of the operator's hand. A locking arrangement is optional, and when equipped, the lock is installed in the downwardly extending front wall of the cover member. A locking aperture is provided in the top surface of the finger grip formed in the front wall of said base member.

9 Claims, 12 Drawing Figures

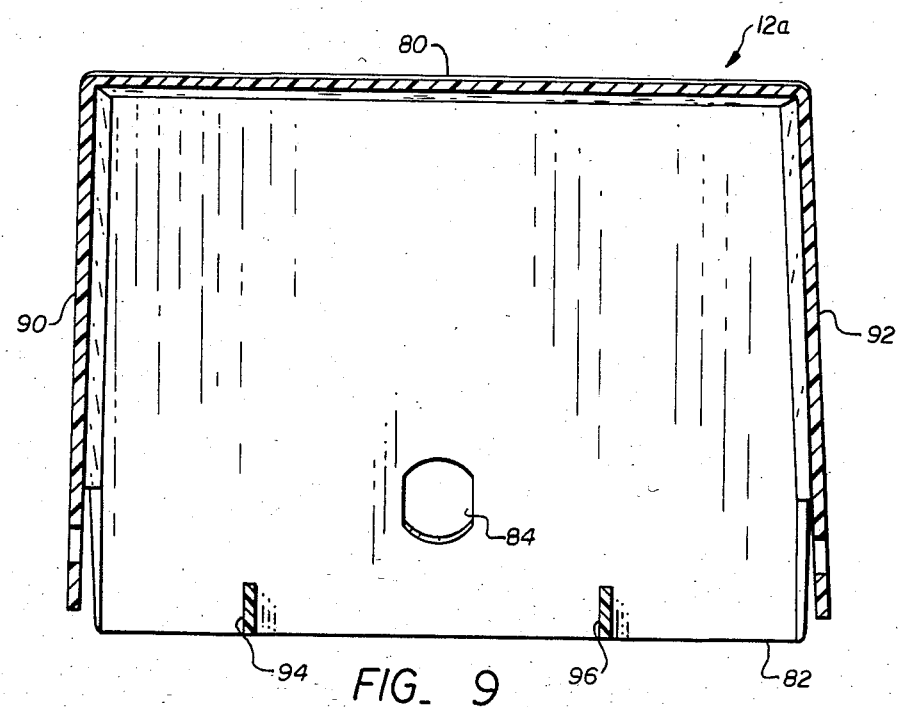
FIG. 9
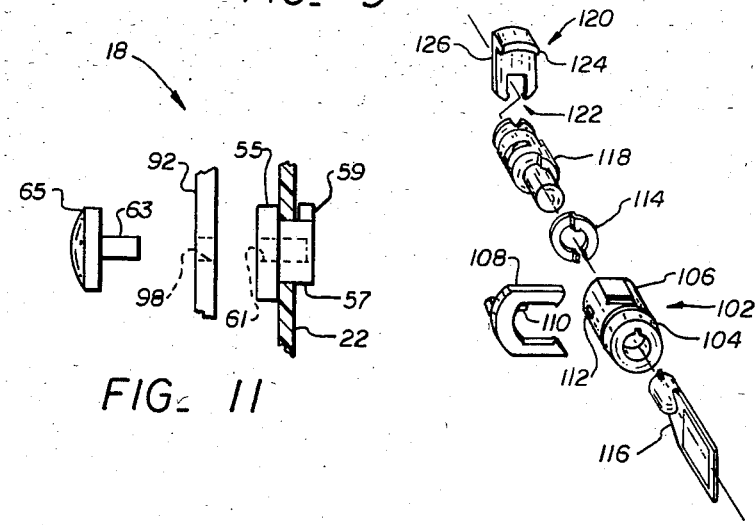
FIG. 11
FIG. 12

STORAGE CONTAINER FOR FLOPPY DISKS AND THE LIKE

BACKGROUND OF THE INVENTION

1. Field of the Invention

This invention relates to the storage of thin substantially rectangular members such as floppy disks, and in particular, to a container that includes a cover member to minimize the exposure to dust and other contaminants and a base that accommodates dividers for organizational separation of related floppy disks.

2. Description of the Prior Art

Magnetic storage disks have found increasing use in a variety of applications relating to computers and word processors. The disks are planar and some what flexible and thus acquired the name "Floppy Disk". Numerous configurations of floppy disk storage containers are provided in the prior art. One such device is illustrated in U.S. Pat. No. 4,225,083, which is a book-like configuration having a pair of overlying covers that are hinged along a side analogous to a binding. One of the covers has a pivotal tray-like insert connected thereto that can be laid within the enclosure formed between the two covers. A slightly different configuration is illustrated in U.S. Pat. No. 4,356,918, in which the container has a base section and a pouch section. The pouch section is adapted to be fitted into the base section in a closed position, and the pouch section is adapted to rotate about an axis so that, in an open position, the bottom of the pouch section rests against the bottom of the base section. The pouch section is arranged such that a partial front wall is adapted to pivot about a transverse axis. This enlarges the pouch section, when in the open position, and facilitates insertion and removal of the floppy disks.

Other containers are disclosed in U.S. Pat. No. Des. 251,273, issued Mar. 7, 1979, to R.A. Egly, and in U.S. Design Application Ser. No. 080,417, filed Oct. 1, 1979, by Jerry M. Long, et al., and U.S. Utility Application Ser. No. 322,968, filed Nov. 19, 1981, by Jerry M. Long et a., both the design and the utility applications commonly owned herewith.

SUMMARY OF THE PRESENT INVENTION

It is an object of this invention to provide a closeable storage container for floppy disks and the like.

It is another object of this invention to provide the container which minimizes accumulation of dust and other contaminants on floppy disks stored in said container.

It is yet another object of the invention to provide dividers which may be positioned to separate sets of diskettes, and which may be shifted in position to provide space for a particular set. Further, the dividers may be angled so as to facilitate selection of the disk sought.

Briefly, the container of this invention comprises a base member having a floor and upwardly extending rear, front and side walls joined to form an open box-like structure having finger grips formed in the front and rear walls and a lip formed at the top of each of said side walls to reduce exposure to contaminants when the container is in the closed condition. A cover member comprises a top and downwardly extending rear, front and side walls that fit over the base wall when in the closed condition. The adjacent side walls are pivotally attached so that the cover may be moved from the opened to the closed condition. Stops are located adjacent the rear base wall and are positioned to intersect the edge of said cover member rear wall when the cover is in the open condition.

IN THE DRAWING

FIG. 9 is a section view along the line 9—9 of FIG. 7;

FIG. 11 is a sectional elevational view of locking hinge pin (18) illustrating the tab (59) and illustrating how it pivotally joins base member (14) and cover member (16); and FIG. 12 is an exploded perspective view of a lock (100).

DETAILED DESCRIPTION OF THE PREFERRED EMBODIMENTS

Figure 1:
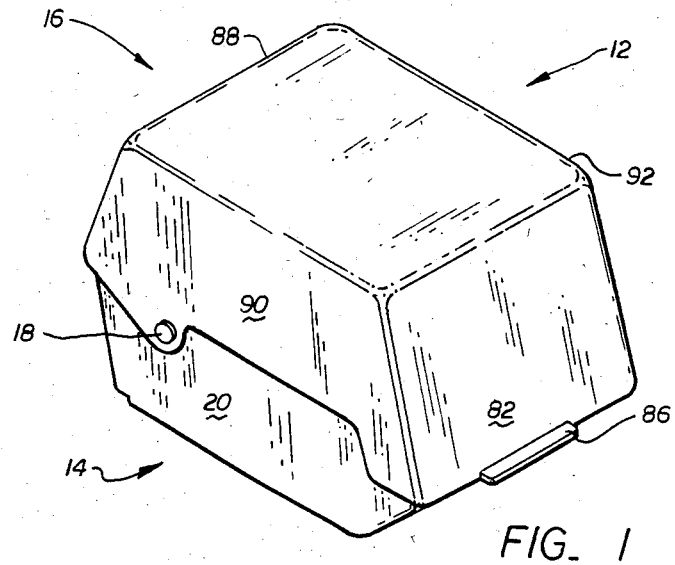
FIG. 1 is a perspective view of the container in a closed condition.
Figure 2:
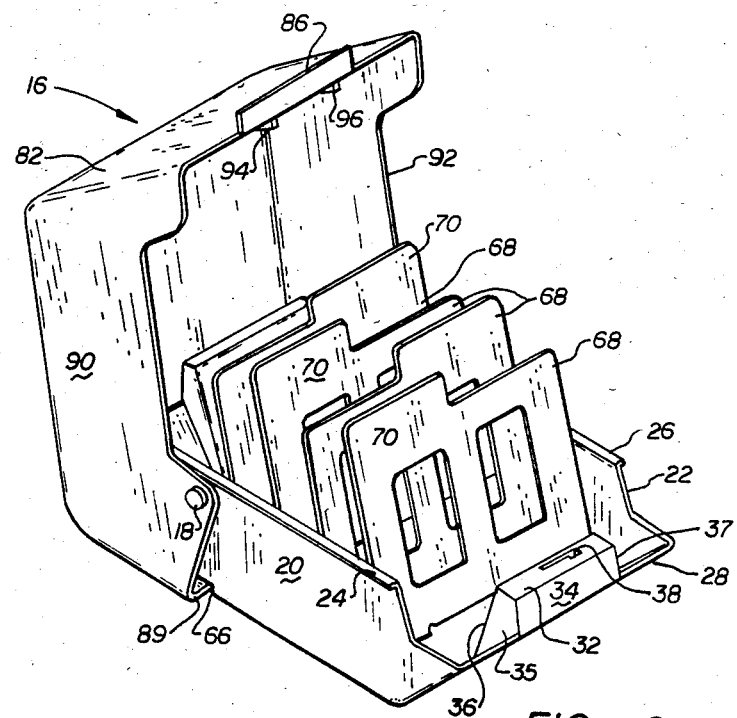
FIG. 2 is a perspective view of the container in the open condition.
Figure 3:
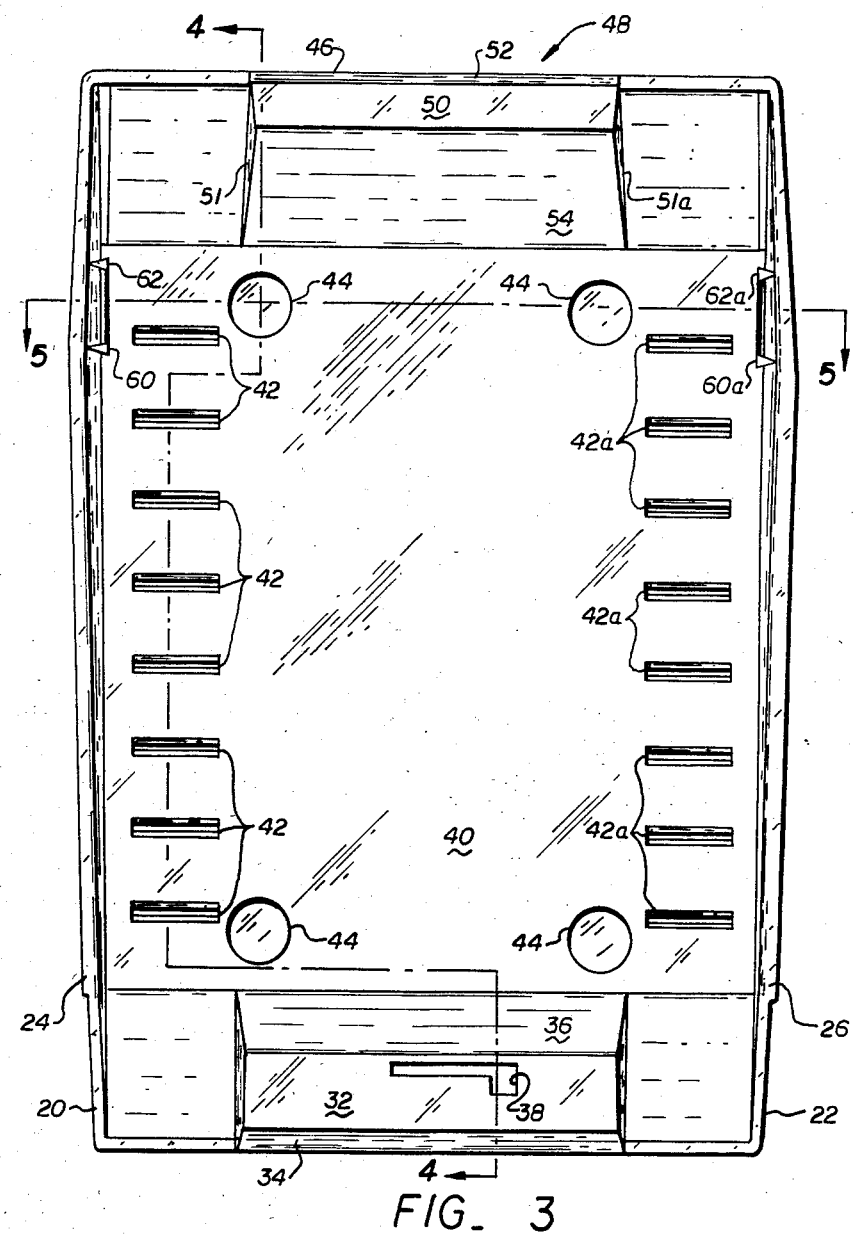
FIG. 3 is a top view of base member (14)

Referring now to FIGS. 1 and 2, many of the significant features of the storage container of the instant invention may be comprehended. Storage container 12 includes a base member 14 and a cover member 16 which is pivotally attached to said base member by means of locking hinge pins such as shown at 18. Base member 14 includes oppositely disposed left and right side walls 20 and 22, respectively. Dust lips 24 and 26 are horizontally disposed outward from respective side walls 20 and 22 and there use minimizes the entrance of dust and other contaminants into the storage container when the cover member 16 is in the closed condition. A forwardly inclined front wall 28 rises only to a level substantially below that of the adjoining side walls 20 and 22 and formed therein is a front wall finger grip 30 that includes a top surface 32 which is supported by a rearwardly inclined front wall 34 and a forwardly inclined rear wall 36. Side walls 35 and 37 complete the enclosure of the finger grip 30 which is formed interiorly of the front wall 28. A locking aperture 38 is formed in the top wall of the finger grip 30 and its use will be discussed in more detail hereinafter.

Figure 4:
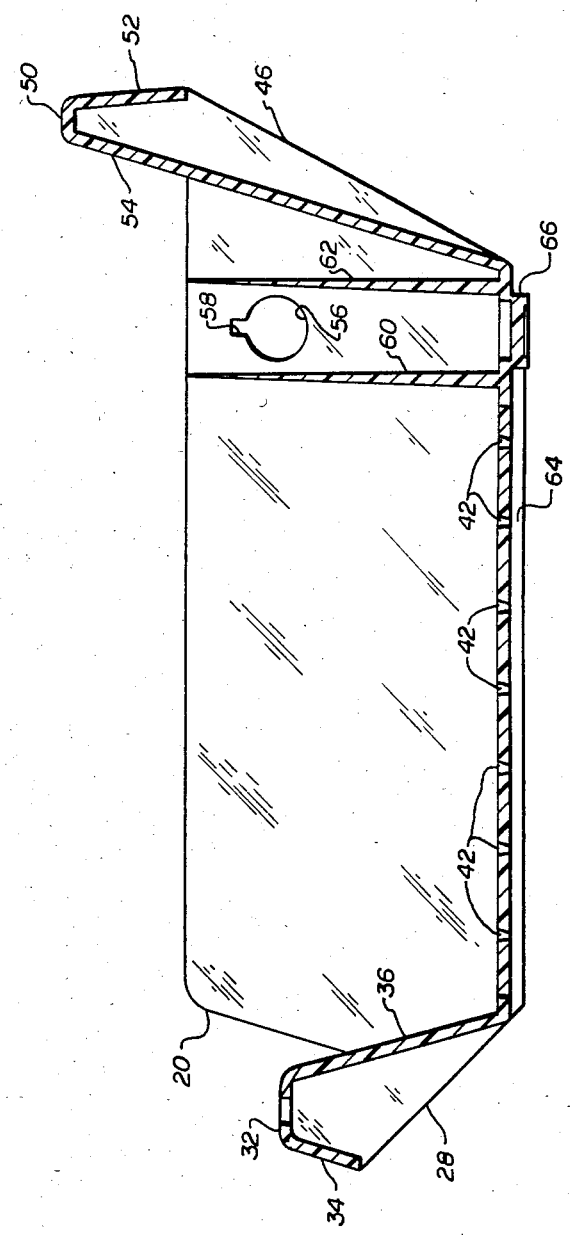
FIG. 4 is a section view along the line 4—4 of FIG. 3.
Figure 5:
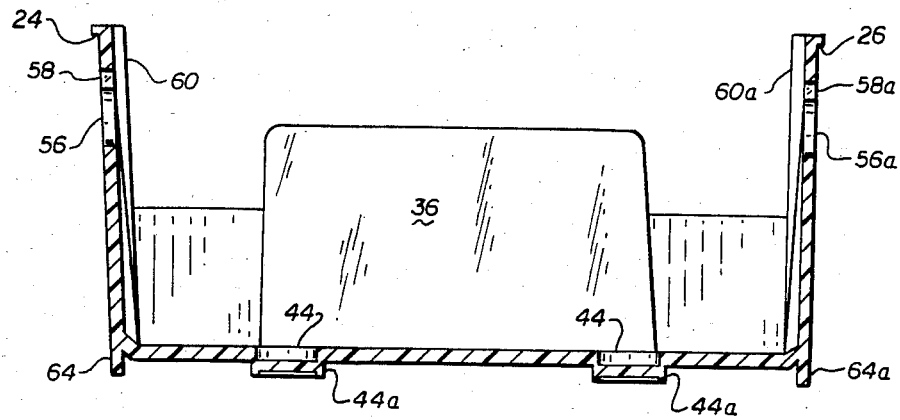
FIG. 5 is a section view along the line 5—5 of FIG. 3.
Figure 6:
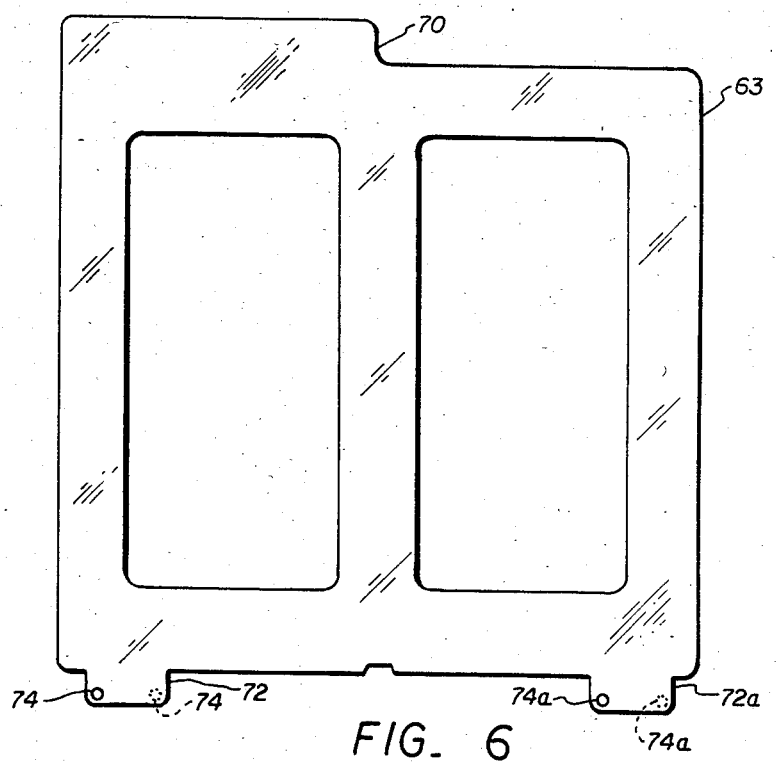
FIG. 6 is an elevation view of a divider (68)
Figure 7:
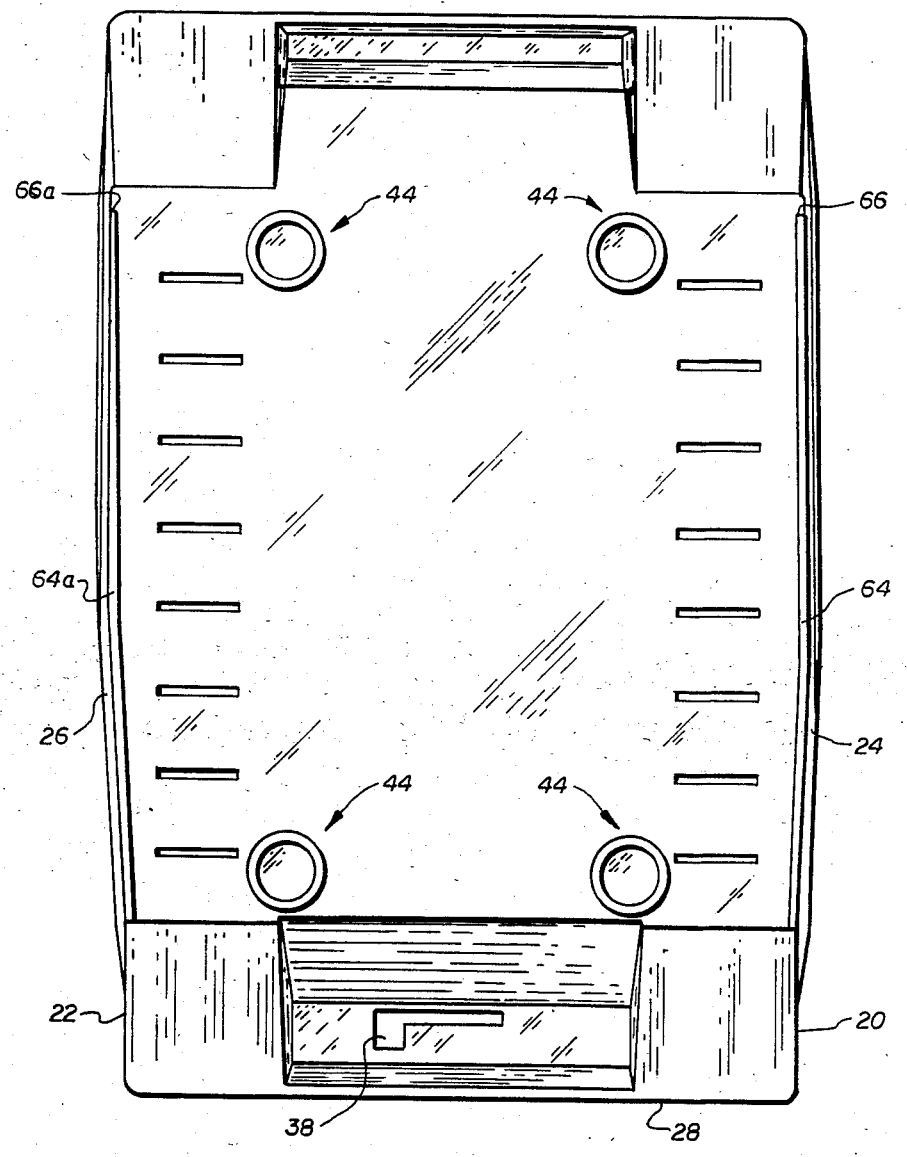
FIG. 7 is a bottom view of base member (14)

Additional features of base member 14 may be seen by reference to FIGS. 3–7. A floor member 40 includes a series of guide slots 42 which are positioned near the left side wall 20 as well as a like number of guide slots 42A positioned adjacent side wall 22, the guide slots being adapted to hold dividers 68 so that they are substantially at right angles to said side walls. The slots are V-shaped with the lower part being narrower than the upper part as shown in FIG. 4. This allows the divider to be easily inserted, but held in position by detent projections 74 and 74A on divider 68. Further, the dividers 68 may be inclined forwardly or backwardly which facilitates the identification and selection of a floppy disk that is to be removed from the file. To support the underside of a floor and to provide clearance for the lower end guide tabs 72 and 72A of dividers 68, legs 44 are formed in the floor member 40 of base member 14.

A rearwardly inclined rear wall 46 has a height substantially the same as the adjoining side walls 20 and 22 and has a rear finger grip 48 centrally formed therein. Finger grip 48 includes a top wall 50, which is supported by a forwardly inclined rear wall 52 and a rearwardly inclined front wall 48. As with the front wall finger grip, side walls 51 and 51A complete the enclosure which allows external access to the finger grip but prevents the dust and other contaminants from entering the closed storage container 12.

Referring now to FIG. 4, it may be seen that a locking hinge pin aperture 56 includes a notch extension 58 in side wall 20 at a position near the rear wall 46. A similar locking hinge pin aperture and notch (not shown) is provided in the side wall 22. Each said locking hinge pin aperture is designed to accept a locking hinge pin such as 18. Strengthening rib 60 and 62 are positioned on diametrically opposite sides of pivot aperture 56 to provide the reinforcement necessary to prevent the unauthorized separation of cover member 16 from base member 14, when the cover member 16 is locked in the closed condition.

Also, shown in FIG. 4 is a skirt 64 that extends from the front wall 28 along the bottom edge of side wall 20 but ending short of the rear wall 46. The back stop edge 66 is located so as to intersect the bottom edge 89 of rear wall 88 when cover member 16 is in the open condition. The stop edge 66 and a corresponding stop edge 66A at the end of skirt 64A at the bottom edge of side wall 22 are located so that the cover member 16 is tilted backward slightly so as to remain in the open condition once the cover member has been fully opened. Further, the stop edges 66 and 66A prevent the cover member 16 from rotating further backward when the case is lifted by the front finger grip for transport in the open condition. This avoids the unbalanced condition that could otherwise occur, when the container is lifted for transport, which unbalance would tend to flip the container out of the hands of the operator.

Referring again to FIG. 4, it may be seen that the rear edge of each of the rear legs is aligned with the plane which passes through the stop edges 66 and 66A.

Figure 8:
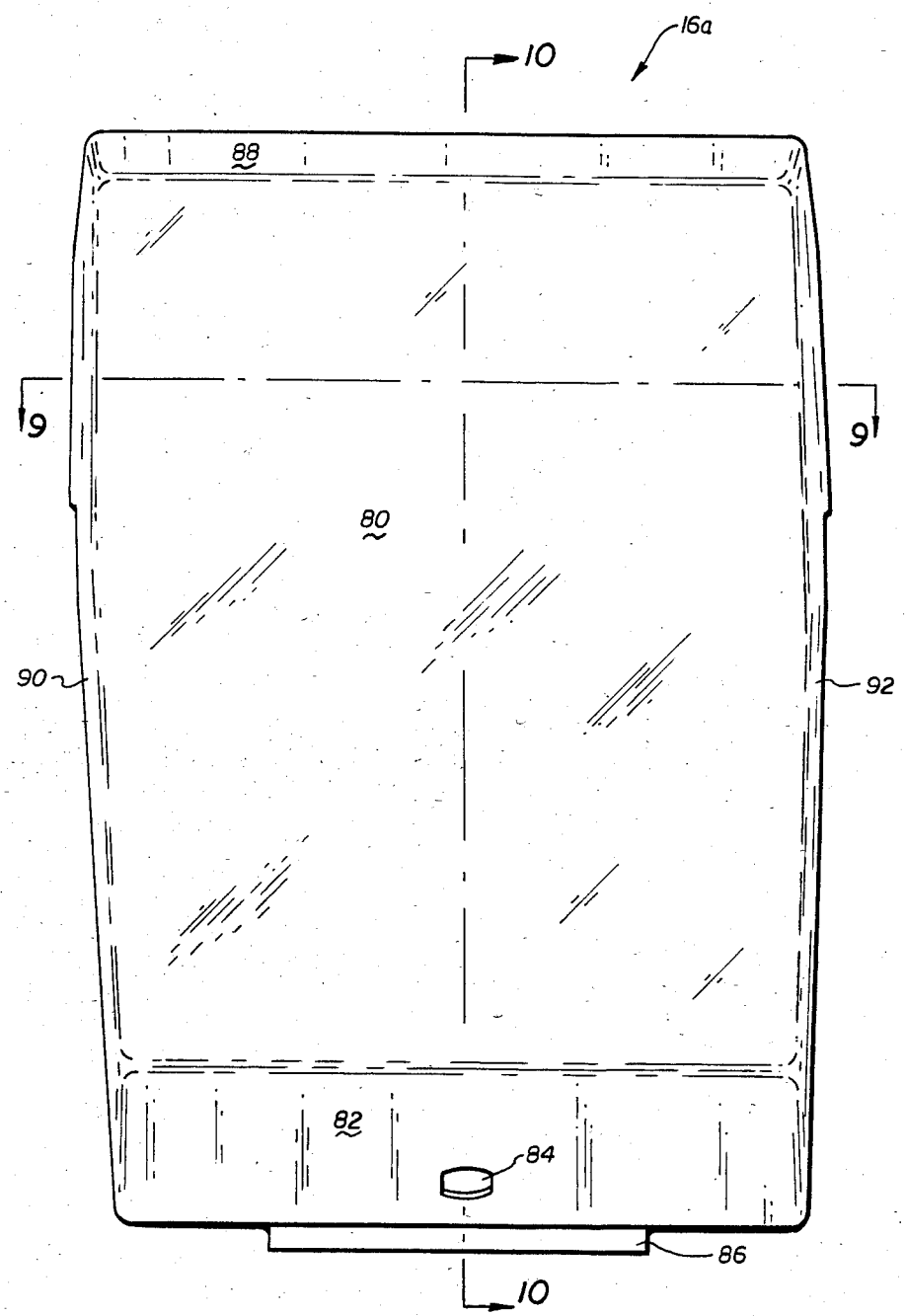
FIG. 8 is a top plan view of the cover member (16)
Figure 10:
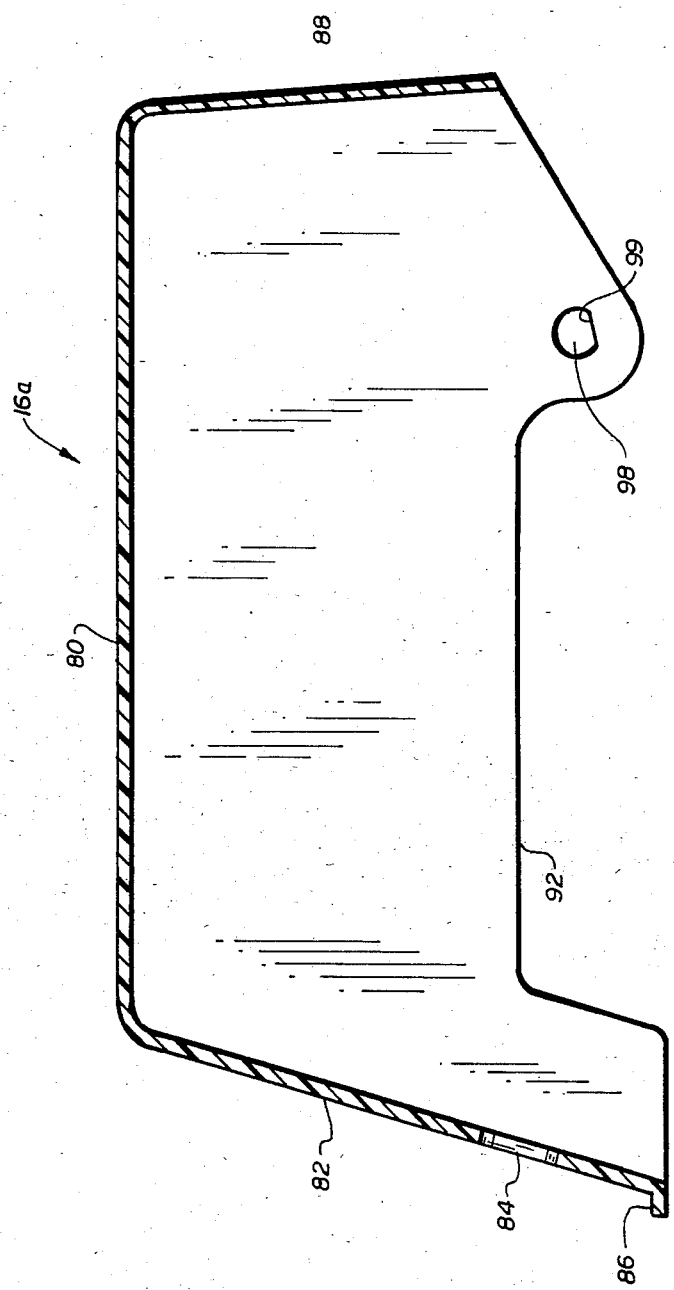
FIG. 10 is a section view along the line 10—10 of FIG. 7.

Referring now to FIGS. 8, 9 and 10, additional features of cover member 16 may be better understood. It should be noted that the cover member shown is that of 16A which includes an aperture in the front wall thereof to accommodate a locking mechanism. This is an optional cover arrangement and differs from that shown in FIGS. 1 and 2 only in the formation of the locking aperture 84. For this reason, the same members have been used to identify the parts both for the cover members as shown as 16 in FIGS. 1 and 2 as well as the cover member 16A shown in FIGS. 8, 9 and 10. As may be seen, a ceiling member 80 is formed with a forwardly inclined front wall 82 that includes the locking aperture 84 and a front lip 86 at the bottom edge thereof to facilitate opening the cover member 16A. The front wall 82 extends downward when in the closed condition so as to rest on the top edge of front wall 28 of base member 14. A rearwardly inclined back wall 88 is of a length to extend below the upper edge of the rear wall 46 and the lower part is slightly outboard therefrom. This reduces the exposure to dust and other contaminants when the storage container is in the closed condition. Left and right side walls 90 and 92, respectively, are formed to extend substantially vertically downward from ceiling member 80 and, except for the area near the front wall, extends only slightly below and outboard of the top edge of the side walls of base member 14. In order to provide for the mounting of the locking hinge pin 18, an extra downward extension is provided in each of the side walls at a point near the back wall. Pivot apertures 98 are formed and include a flat portion 99 to provide for alignment of the locking hinge pin as will be discussed in more detail hereinafter. The downward extension of the front portion of each side wall covers the area which would be exposed by the formed base member side walls. By referring to FIG. 11 along with the following discussion, the manner in which the locking hinge pin assembly 18 is attached to pivotally interconnect the side walls 20 and 22 of base member 14 with the side walls 90 and 92 of cover member 16 may be understood. Only the arrangement for one side wall is shown. It is to be understood that the other side wall would be pivotally attached in a similar manner. A pivot latching member 53 includes a spacer 55 and an axially extension 57 that includes a tab 59. The pivot latching member 53 is inserted in aperture 56 with tab 59 initially being inserted through the notch 58. Pivot latching member 53 is then turned in position so that tab 59 does not appear in notch 58 when the cover member 16 is in the closed condition. Next, the axial extension 63 which has a flat, is aligned with aperture 98 in wall 92 so that the flats are in correspondence and the axial extension 63 is inserted in axial aperture 61 of the pivot latching member 53. The pivot pin 65 is then sonically welded to pivot latching member 53 and when a similar arrangement has been completed for the opposite side thereof, the cover member is pivotally attached to the base member 14. Further, the tabs 59 are positioned such that they are adjacent either the side wall 22 or 20, when the cover member 16 is in the closed condition. The tabs and reinforcing members, such as 60 and 62, adjacent the locking aperture provide an arrangement that resists an axial force. This minimizes the possibility of springing the side walls apart in order to gain access to the disks stored in the container 12 when the cover is locked to the base.

The locking member is illustrated in FIG. 12 and it may be seen that the lock assembly 100 includes a housing 102 that has a front shoulder 104 that abuts with the front wall 82. A rear part 106 passes through aperture 84 and the housing is held in position by U-clip 108 that include an alignment finger 110 that mates with apeture 112 in housing 102. A lock worker 114 provides the locking action with key 116 and is mounted on the forward end of barrel 118. A latch 120 has a U-clip 122 by which it is attached for turning engagement with the back end of barrel 118. The latch has a tab 124 attached to the distal end of member 126.

While the present invention has been described above with reference to particular and preferred embodiments, it is contemplated that various alterations and modifications will no doubt become apparent to those skilled in the art after having read this disclosure, it is therefore intended that the appended claims be interpreted as covering all such alterations and modifications as fall within the true spirit and scope of the invention.

What is claimed is:

1. A container for storing floppy disks and the like, comprising:
   a base member including means forming a floor, oppositely disposed side walls, a back wall including a rear finger grip centrally formed as a part thereof and a forwardly inclined front wall having a height substantially less than said side wall, said front wall including a front finger grip forming a central part thereof, the floor of said base portion including both front and rear pairs of legs formed therein and a plurality of guide slots;

a cover member including means forming a ceiling, oppositely disposed downwardly extending side walls, a rear wall and a forwardly inclined front wall which has a length greater than said rear wall for mating with said inclined front wall of said base portion;

means for pivotally interconnecting said base portion with said cover portion so that the cover portion may be rotated away from said base portion to an open position to permit access to said disks or to a closed position to protect said disks from contaminants such as dust and the like, said interconnecting means including a pivot aperture formed in each side wall of said base member, each said pivot aperture including a notch, a pivot locking member including a spacer portion, an axial extension from said spacer portion and a tab at the distal end of said axial extension, said tab passing through said notch and said spacer end being adjacent the exterior of said side wall, the spacer end including an axial aperture, a pivot pin aperture formed in each said downwardly extending side wall of said cover member, said pivot pin aperture including a flat, a pivot pin having a shoulder and an axial extension including a flat and adapted for insertion through said pivot pin aperture of said cover member and into said axial aperture of said pivot locking member, and means for affixing said pivot pin to said locking member; and stop means for holding said cover member in a predetermined orientation relative to said base member when in open position.

2. A container as set forth in claim 1 wherein said stop means comprises:

skirt means formed along the bottom of said base means and in substantial alignment with said side walls, the rear end of said skirt means being positioned to be intersected by the bottom edge of said rear wall when said cover member is rotated away from said base portion, whereby said cover member may be held in said open position even when carried.

3. A container as set forth in claim 1 wherein said front finger grip comprises:

a first wall portion extending upwardly from said floor at an angle to the horizontal which is greater than that of the adjacent portions of said base front wall and forming a depression in said front wall;

a second wall portion extending upwardly and rearwardly from the top edge of said base front wall to provide an interior gripping surface; and an integrally formed top member intersecting the upper extremeties of said first and second portions.

4. A container as set forth in claim 3 wherein said rear finger grip comprises:

a third wall portion rising from said floor at an angle which is less than that of the rearwardly inclined back wall, and forming a depression in said back wall, said third wall portion having a height greater than the adjacent portions of said back wall;

a fourth wall portion rising from the level of the top edge of said back wall; and an integrally formed top member intersecting said third and fourth wall portions to form a cavity in which the fingers of a user may be inserted when the lid is closed and the container is to be moved.

5. A container as set forth in claim 4 wherein a key slot is formed in said top member.

6. A container as set forth in claim 5 wherein an aperture is formed in the inclined front wall whereby a locking member may be installed therein.

7. A container as set forth in claim 6 including divider means inserted in selected ones of said guide slots.

8. A container as set forth in claim 7 wherein said guide slots are formed in two parallel rows and spaced at regular intervals, each row being adjcent one said side wall.

9. A container as set forth in claim 8 wherein said divider means comprises:

a substantially flat rectangular member including top, bottom and oppositely disposed sides, an index tab formed to extend upwardly from said top along only a portion thereof and adjacent one said side; and a pair of guide tabs attached adjacent each said side on the bottom thereof for insertion in said guide slots, each said guide tab including a projection to hold the divider in said guide slot.

* * * * *